US012799910B2

(12) United States Patent
Dyess

(10) Patent No.: US 12,799,910 B2
(45) Date of Patent: Nov. 17, 2026

(54) ELECTRONIC METERING ROD ACTUATOR FOR CARBURETOR

(71) Applicant: Kimberlyte Holdings, LLC, Kansas City, MO (US)

(72) Inventor: William Corey Dyess, Kansas City, MO (US)

(73) Assignee: Kimberlyte Holdings, LLC, Kansas City, MO (US)

( * ) Notice: Subject to any disclaimer, the term of this patent is extended or adjusted under 35 U.S.C. 154(b) by 0 days.

(21) Appl. No.: 18/975,458

(22) Filed: Dec. 10, 2024

(65) Prior Publication Data

US 2025/0198369 A1 Jun. 19, 2025

Related U.S. Application Data

(60) Provisional application No. 63/611,858, filed on Dec. 19, 2023.

(51) Int. Cl.

| | |
|---|---|
| ***F02M 69/22*** | (2006.01) |
| ***F02D 41/26*** | (2006.01) |
| ***F02M 7/20*** | (2006.01) |
| ***F02M 17/38*** | (2006.01) |

(52) U.S. Cl.

CPC ............... *F02M 7/20* (2013.01); *F02D 41/26* (2013.01); *F02M 17/38* (2013.01); *F02M 69/22* (2013.01)

(58) Field of Classification Search

CPC .......... F02M 19/04; F02M 69/22; F02M 7/20; F02M 17/38; F02D 41/26

See application file for complete search history.

(56) References Cited

U.S. PATENT DOCUMENTS

| | | | | |
|---|---|---|---|---|
| 4,074,144 | A * | 2/1978 | Kawai | H01H 13/64 200/86.5 |
| 4,206,735 | A * | 6/1980 | Miles | F02M 69/22 123/445 |
| 4,286,562 | A * | 9/1981 | Stoltman | F02M 69/20 123/462 |
| 4,364,356 | A * | 12/1982 | Gerhold | F02D 41/1481 60/276 |
| 5,538,673 | A | 7/1996 | Edmonston | |
| 8,931,458 | B2 * | 1/2015 | Dyess | F02M 19/081 123/434 |
| 10,371,100 | B2 | 8/2019 | Dyess et al. | |
| 2007/0209635 | A1 | 9/2007 | Ottosson et al. | |
| 2009/0013951 | A1 | 1/2009 | Nakata et al. | |

(Continued)

OTHER PUBLICATIONS

International Search Report and Written Opinion for PCT application No. PCT/US2024/059325, dated Feb. 27, 2025.

*Primary Examiner* — Gonzalo Laguarda

(74) *Attorney, Agent, or Firm* — Honigman LLP; Andrew S. Chipouras

(57) ABSTRACT

A carburetor for an internal combustion engine includes a body having an air inlet opening portion, an air outlet opening portion, and a throat portion extending therebetween. A fuel reservoir is in fluid communication with the throat portion. A slide assembly is movably disposed in the body for movement across the throat portion. The slide assembly includes a metering rod extending across the throat portion and into the fuel reservoir. An electrically operable actuator, when operated, adjusts an axial position of the metering rod relative to the fuel reservoir.

57 Claims, 10 Drawing Sheets

(56) References Cited

U.S. PATENT DOCUMENTS

| | | | | |
|---|---|---|---|---|
| 2009/0211555 | A1 * | 8/2009 | Fischer .................... | F02M 7/16 123/437 |
| 2018/0156160 | A1 | 6/2018 | Nonaka et al. | |

* cited by examiner

ELECTRONIC METERING ROD ACTUATOR FOR CARBURETOR

CROSS-REFERENCE TO RELATED APPLICATIONS

This application claims priority to and the benefit of U.S. provisional application No. 63/611,858, filed Dec. 19, 2023, the contents of which are herein incorporated by reference.

TECHNICAL FIELD

This disclosure relates to a carburetor for an internal combustion engine, and more particularly, to a slide and pin style carburetor having a slide throttle mechanism and a metering rod.

BACKGROUND

Carburetors are reliable, robust mechanisms for efficiently metering fuel to an internal combustion engine. A carburetor meters the appropriate amount of fuel according to engine demand based on intake airflow to the engine. Generally, carburetors operate on the principle that as the velocity of airflow through a restriction increases, its pressure decreases. Carburetors are configured to take advantage of the pressure differential created between atmospheric pressure surrounding the carburetor and a low pressure region created inside the carburetor, usually by way of a venturi. As an engine draws air through the venturi, the low pressure region created by the increasing air velocity meters a proportional amount of fuel into the intake airflow stream. As passive devices, carburetors are both reliable and robust, while thoroughly mixing fuel with incoming airflow which enhances efficient combustion.

While carburetors are simple and cost effective fuel delivery systems, modern emissions requirements have limited the application of carburetors and increased use of electronic fuel injection in order to maintain precise control of fuel delivery. However, electronic fuel injection has been primarily designed for automotive applications and these arrangements call for the addition of catalytic converter exhaust systems as an emissions reduction strategy. These cumbersome and complicated systems present challenges for fitment and packaging, as well as sufficient electrical charging and energy storage capabilities for small equipment and light transportation applications, among others. That is, when applied to applications designed to be simple and lightweight, many existing electronic fuel injection systems are unsuitable for adoption due to their complexity, size, and increased costs. Accordingly, these applications face intensifying economic and regulatory challenges related to integration of computer controlled engine monitoring and diagnostic systems.

SUMMARY

One aspect of the disclosure provides a carburetor for an internal combustion engine. The carburetor includes a body having an air inlet opening portion, an air outlet opening portion, and a throat portion extending therebetween. A fuel reservoir is in fluid communication with the throat portion. A slide assembly is movably disposed in the body for movement across the throat portion. The slide assembly includes a metering rod extending across the throat portion and into the fuel reservoir. An electrically operable actuator, when operated, adjusts an axial position of the metering rod relative to the fuel reservoir.

Implementations of the disclosure may include one or more of the following optional features. In some implementations, as airflow moves from the air inlet opening portion to the air outlet opening portion through the throat portion, adjustment of the axial position of the metering rod adjusts an amount of fuel introduced to the airflow within the throat portion from the fuel reservoir. In further implementations, the electrically operable actuator adjusts the axial position of the metering rod based on an air-to-fuel ratio. In some further implementations, the air-to-fuel ratio is determined based on sensor data generated by an oxygen sensor sensing an exhaust stream from the internal combustion engine. In further implementations, the electrically operable actuator adjusts the axial position of the metering rod at least between a cold start position, a baseline position, and a wide-open position. The amount of fuel introduced to the airflow is greater with the metering rod in the cold start position and the wide-open position than with the metering rod in the baseline position. In even further implementations, the electrically operable actuator adjusts the metering rod to the cold start position based on determination that a temperature of the internal combustion engine is below a threshold temperature. In other even further implementations, the electrically operable actuator adjusts the metering rod from the cold start position to one of the baseline position and the wide-open position based on determination that a temperature of the internal combustion engine is above a threshold temperature. In other even further implementations, with the metering rod in one of the cold start position, the baseline position, and the wide-open position, the electrically operable actuator finely adjusts the axial position of the metering rod.

In some examples, the slide assembly further includes a throttle slide. The metering rod extends through the throttle slide and is axially movable independent of movement of the throttle slide. In some aspects, the electrically operable actuator adjusts the axial position of the metering rod responsive to a signal from an engine control unit of the internal combustion engine.

In some implementations, the electrically operable actuator adjusts the axial position of the metering rod based on at least one of a target power output of the internal combustion engine, a target efficiency of the internal combustion engine, and a target emissions level of the internal combustion engine. In some examples, the electrically operable actuator adjusts the axial position of the metering rod based on an input of at least one of an air-to-fuel ratio at an exhaust stream of the internal combustion engine, a rotational speed of a crankshaft of the internal combustion engine, a throttle position, a coolant temperature of the internal combustion engine, a temperature of air intake of the internal combustion engine, a pressure of air intake of the internal combustion engine, and a knock signal.

In some aspects, the carburetor further includes an electrically operable vibration actuator that, when operated, vibrates the metering rod at a frequency. The frequency is determined based on a rotational speed of a crankshaft of the internal combustion engine and a duration of an opening period for an intake port fluidly coupled to the air inlet opening portion.

In some implementations, the electrically operable actuator adjusts the axial position of the metering rod relative to the fuel reservoir in increments of 0.001 inches or less. The electrically operable actuator includes one of a stepper motor, a voice coil actuator, and an encapsulated linear actuator. In some examples, operation of the electrically operable actuator to adjust the axial position of the metering rod relative to the fuel reservoir is controlled according to a closed-loop feedback system.

Another aspect of the disclosure provides a computer-implemented method that when executed on data processing hardware causes the data processing hardware to perform operations. The operations include, as airflow moves through a throat portion of a carburetor of an internal combustion engine, operating an electrically operable actuator to adjust an axial position of a metering rod relative to a fuel reservoir of the carburetor. The fuel reservoir is in fluid communication with the throat portion. The metering rod extends across the throat portion and into the fuel reservoir. Adjustment of the axial position of the metering rod adjusts an amount of fuel introduced to the airflow within the throat portion from the fuel reservoir. This aspect may include one or more of the following optional features.

In some implementations, the electrically operable actuator is operated to adjust the axial position of the metering rod based on an air-to-fuel ratio. In further implementations, the air-to-fuel ratio is determined based on sensor data generated by an oxygen sensor sensing an exhaust stream from the internal combustion engine.

In some examples, the operations further include operating the electrically operable actuator to adjust the axial position of the metering rod at least between a cold start position, a baseline position, and a wide-open position. The amount of fuel introduced to the airflow is greater with the metering rod in the cold start position and the wide-open position than with the metering rod in the baseline position. In further examples, the operations further include operating the electrically operable actuator to adjust the metering rod to the cold start position based on determination that a temperature of the internal combustion engine is below a threshold temperature. In other further examples, the operations further include operating the electrically operable actuator to adjust the metering rod from the cold start position to one of the baseline position and the wide-open position based on determination that a temperature of the internal combustion engine is above a threshold temperature. In other further examples, the operations further include, with the metering rod in one of the cold start position, the baseline position, and the wide-open position, operating the electrically operable actuator to finely adjust the axial position of the metering rod.

In some aspects, the metering rod extends through a throttle slide of the carburetor and is axially movable independent of movement of the throttle slide. In some implementations, operating the electrically operable actuator to adjust the axial position of the metering rod is responsive to a signal from an engine control unit of the internal combustion engine.

In some examples, operating the electrically operable actuator to adjust the axial position of the metering rod is based on at least one of a target power output of the internal combustion engine, a target efficiency of the internal combustion engine, and a target emissions level of the internal combustion engine. In some aspects, operating the electrically operable actuator to adjust the axial position of the metering rod is based on an input of at least one of an air-to-fuel ratio at an exhaust stream of the internal combustion engine, a rotational speed of a crankshaft of the internal combustion engine, a throttle position, a coolant temperature of the internal combustion engine, a temperature of air intake of the internal combustion engine, a pressure of air intake of the internal combustion engine, and a knock signal.

In some implementations, the operations further include operating an electrically operable vibration actuator to vibrate the metering rod at a frequency. In further implementations, the frequency is determined based on a rotational speed of a crankshaft of the internal combustion engine and a duration of an opening period for an intake port fluidly coupled to the throat portion.

In some examples, the electrically operable actuator adjusts the axial position of the metering rod relative to the fuel reservoir in increments of 0.001 inches or less. In some aspects, the electrically operable actuator includes one of a stepper motor, a voice coil actuator, and an encapsulated linear actuator. In some implementations, operating the electrically operable actuator to adjust the axial position of the metering rod relative to the fuel reservoir of the carburetor is controlled according to a closed-loop feedback system.

Yet another aspect of the disclosure provides a system. The system includes a carburetor for an internal combustion engine. The carburetor includes a body, a fuel reservoir, and a slide assembly. The body has an air inlet opening portion, an air outlet opening portion, and a throat portion extending therebetween. The fuel reservoir is in fluid communication with the throat portion. The slide assembly is movably disposed in the body for movement across the throat portion. The slide assembly includes a metering rod extending across the throat portion and into the fuel reservoir. The system includes an electrically operable actuator that, when operated, adjusts an axial position of the metering rod relative to the fuel reservoir. The system includes memory hardware storing instructions that, when executed on data processing hardware in communication with the data processing hardware, causes the data processing hardware to perform operations. The operations include, as airflow moves from the air inlet opening portion to the air outlet opening portion through the throat portion, operating the electrically operable actuator to adjust the axial position of the metering rod. Adjustment of the axial position of the metering rod adjusts an amount of fuel introduced to the airflow within the throat portion from the fuel reservoir. This aspect may include one or more of the following optional features.

In some implementations, the electrically operable actuator is operated to adjust the axial position of the metering rod based on an air-to-fuel ratio. In further implementations, the air-to-fuel ratio is determined based on sensor data generated by an oxygen sensor sensing an exhaust stream from the internal combustion engine.

In some examples, the operations further include operating the electrically operable actuator to adjust the axial position of the metering rod at least between a cold start position, a baseline position, and a wide-open position. The amount of fuel introduced to the airflow is greater with the metering rod in the cold start position and the wide-open position than with the metering rod in the baseline position. In further examples, the operations further include operating the electrically operable actuator to adjust the metering rod to the cold start position based on determination that a temperature of the internal combustion engine is below a threshold temperature. In other further examples, the operations further include operating the electrically operable actuator to adjust the metering rod from the cold start position to one of the baseline position and the wide-open position based on determination that a temperature of the internal combustion engine is above a threshold temperature. In other further examples, the operations further include, with the metering rod in one of the cold start position, the baseline position, and the wide-open position, operating the electrically operable actuator to finely adjust the axial position of the metering rod.

In some aspects, the metering rod extends through a throttle slide of the carburetor and is axially movable independent of movement of the throttle slide. In some implementations, operating the electrically operable actuator to adjust the axial position of the metering rod is responsive to a signal from an engine control unit of the internal combustion engine.

In some examples, operating the electrically operable actuator to adjust the axial position of the metering rod is based on at least one of a target power output of the internal combustion engine, a target efficiency of the internal combustion engine, and a target emissions level of the internal combustion engine. In some aspects, operating the electrically operable actuator to adjust the axial position of the metering rod is based on an input of at least one of an air-to-fuel ratio at an exhaust stream of the internal combustion engine, a rotational speed of a crankshaft of the internal combustion engine, a throttle position, a coolant temperature of the internal combustion engine, a temperature of air intake of the internal combustion engine, a pressure of air intake of the internal combustion engine, and a knock signal.

In some implementations, the operations further include operating an electrically operable vibration actuator to vibrate the metering rod at a frequency. In further implementations, the frequency is determined based on a rotational speed of a crankshaft of the internal combustion engine and a duration of an opening period for an intake port fluidly coupled to the throat portion.

In some examples, the electrically operable actuator adjusts the axial position of the metering rod relative to the fuel reservoir in increments of 0.001 inches or less. In some aspects, the electrically operable actuator includes one of a stepper motor, a voice coil actuator, and an encapsulated linear actuator. In some implementations, operating the electrically operable actuator to adjust the axial position of the metering rod is controlled according to a closed-loop feedback system.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
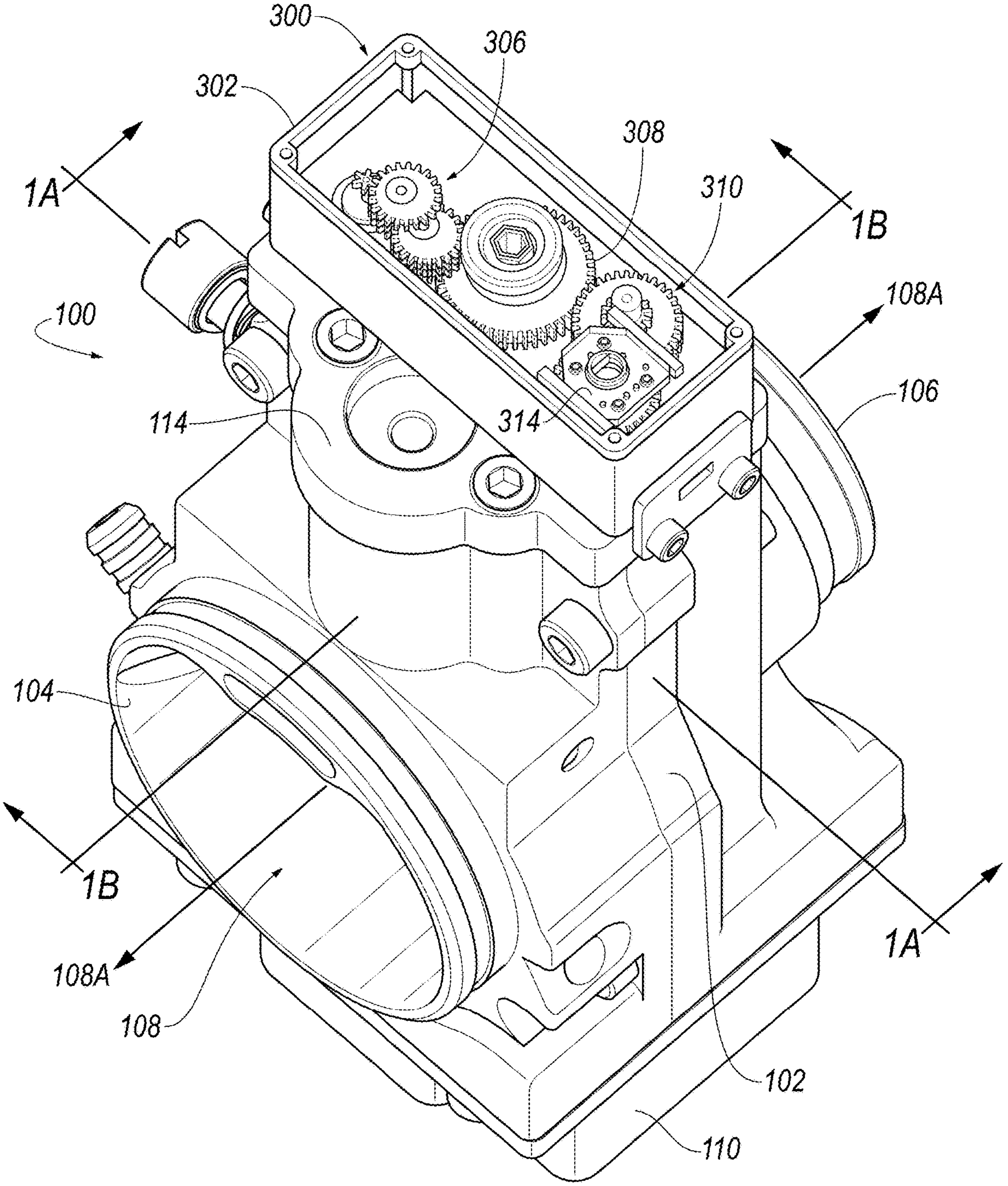
FIG. 1 is a perspective view of a carburetor having an actuator assembly, with an upper panel of the housing of the actuator assembly removed.

Referring now to the drawings and the illustrative embodiments depicted therein, a carburetor system 100 for an internal combustion engine includes a carburetor body 102 having an air inlet opening 104 and an air outlet opening 106, with a throat portion or passageway 108 extending between the air inlet opening 104 and the air outlet opening 106 (FIG. 1). The air inlet opening 104 is configured to receive airflow from an intake manifold fluidly coupled to the air inlet opening 104, where fuel is introduced to the airflow along the throat 108 (such as at a venturi), and the air outlet opening 106 delivers the air and fuel mixture to a throttle valve fluidly coupled to the air outlet opening 106. A fuel reservoir 110 is in fluid communication with the throat 108 and holds fuel that is delivered to the throat 108 according to pressure differentials between the fuel reservoir 110 and the throat 108 caused by the airflow. Fuel is delivered from a metering passageway or channel 112 extending between the fuel reservoir 110 and an opening along the throat 108 between the air inlet opening 104 and the air outlet opening 106.

Figure 1A:
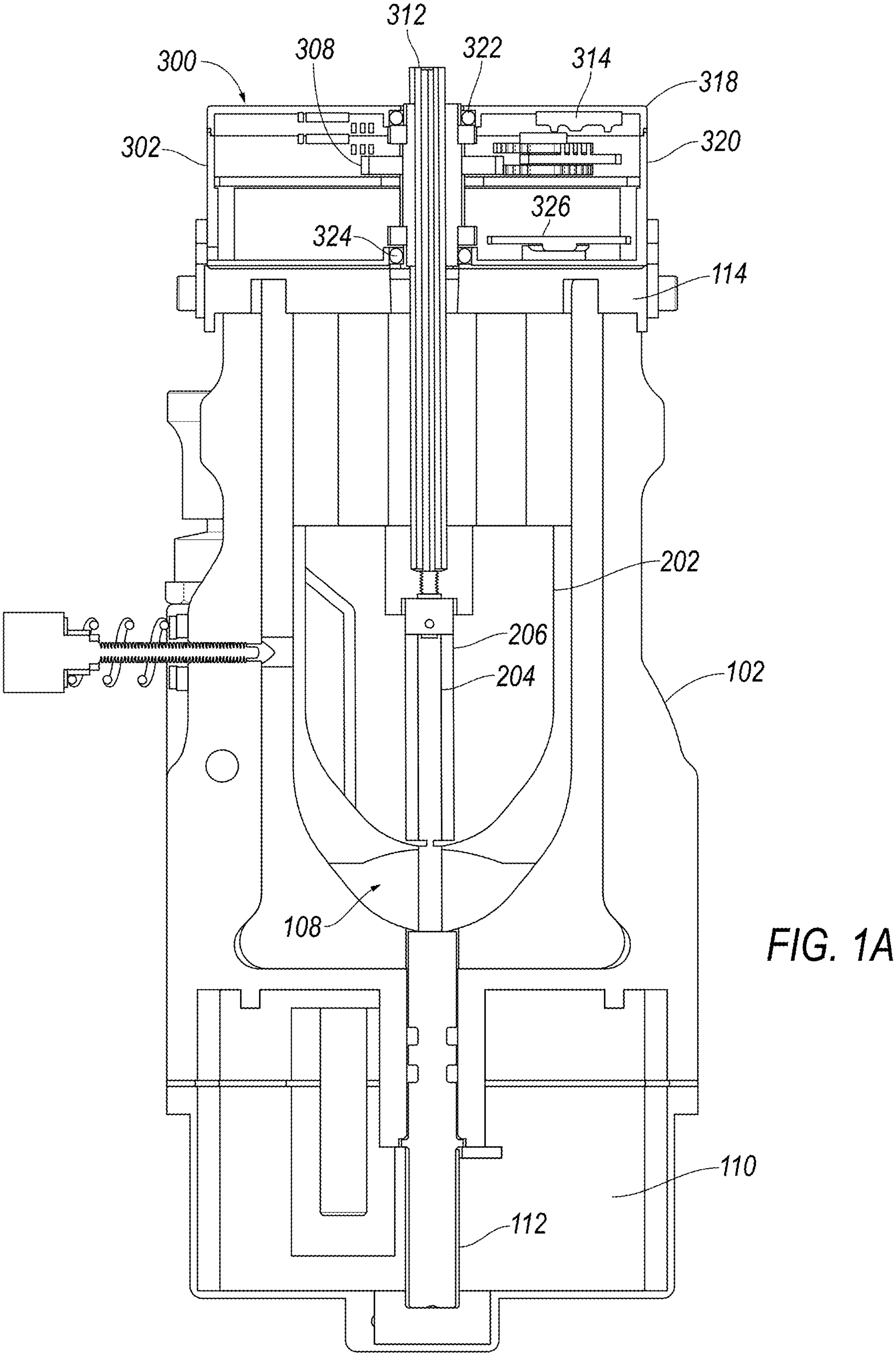
FIG. 1A is a sectional view of the carburetor taken along line 1A-1A of FIG. 1.
Figure 1B:
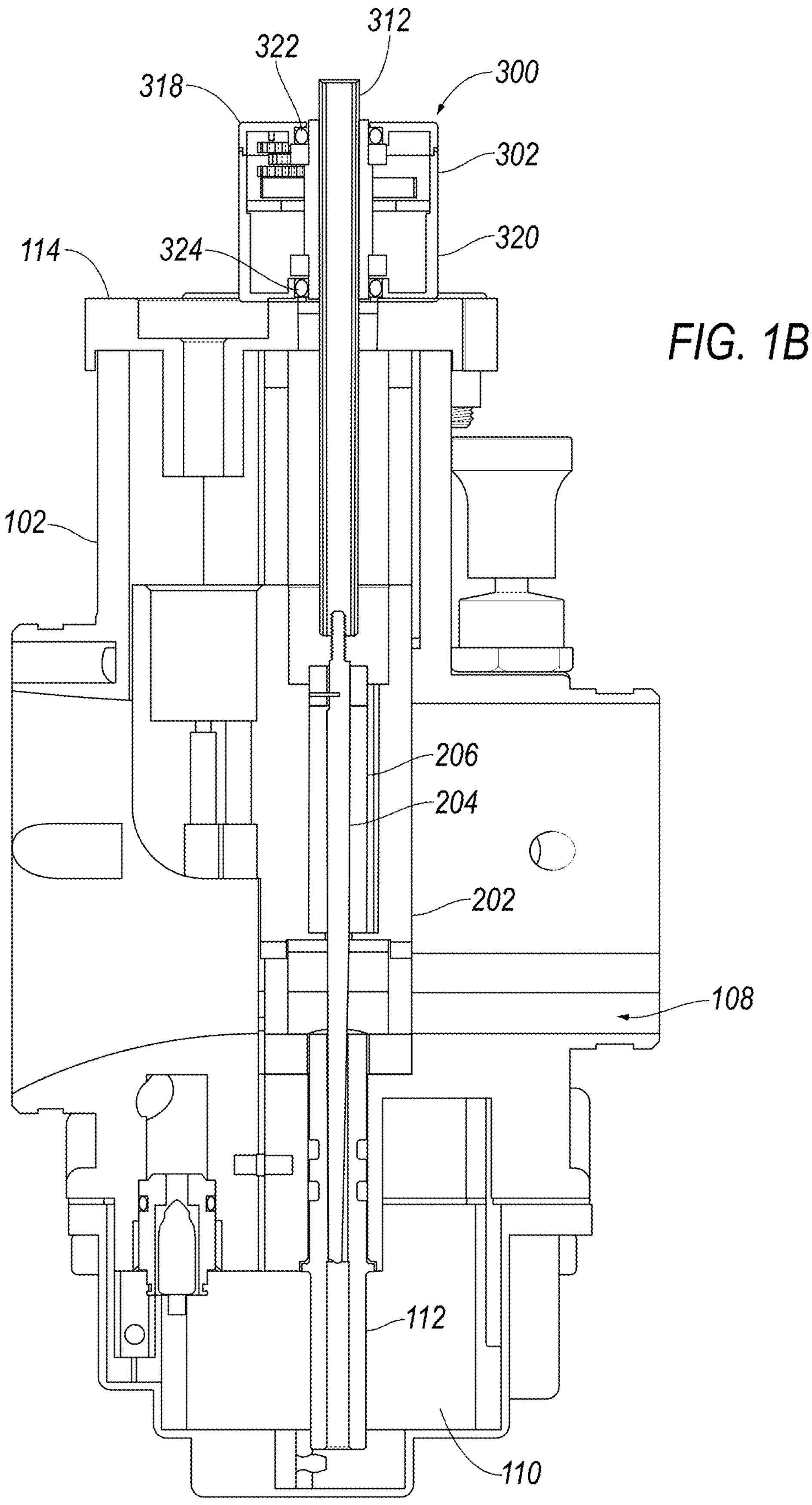
FIG. 1B is a sectional view of the carburetor taken along line 1B-1B of FIG. 1.
Figure 2:
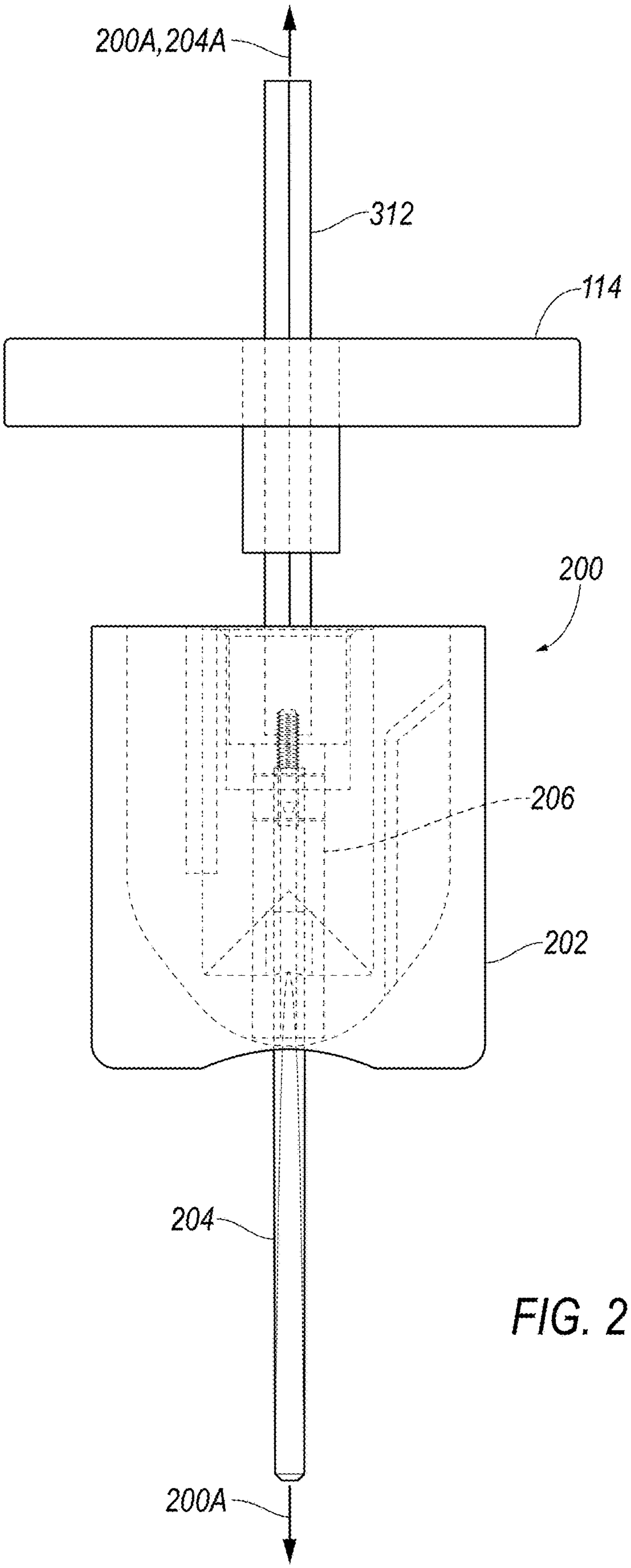
FIG. 2 is a plan view of a slide assembly of the carburetor.
Figure 3:
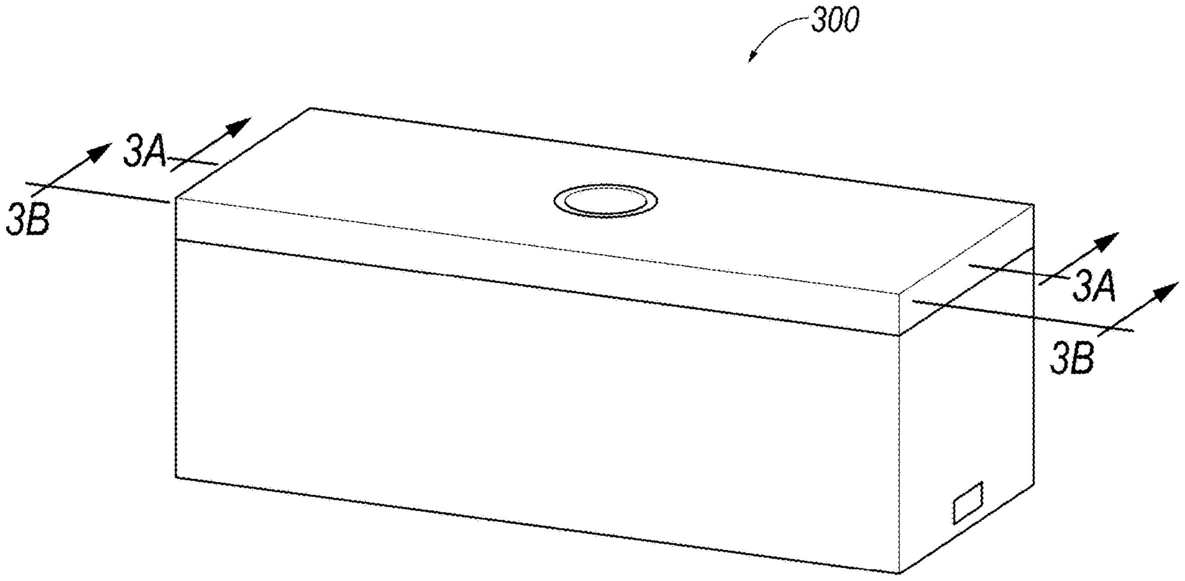
FIG. 3 is a perspective view of the actuator assembly of the carburetor.
Figure 3A:
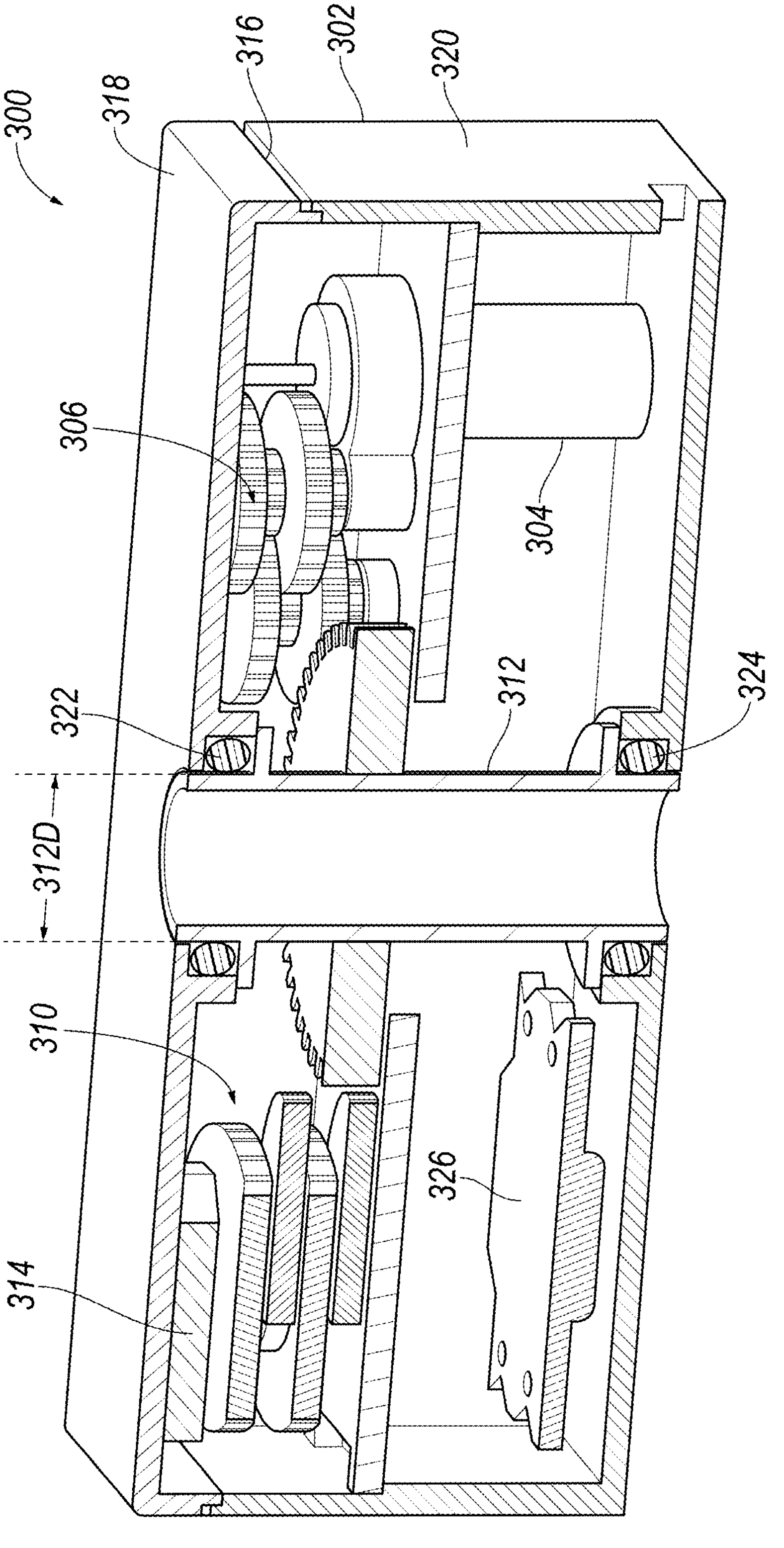
FIG. 3A is a sectional view of the actuator assembly taken along line 3A-3A of FIG. 3.
Figure 3B:
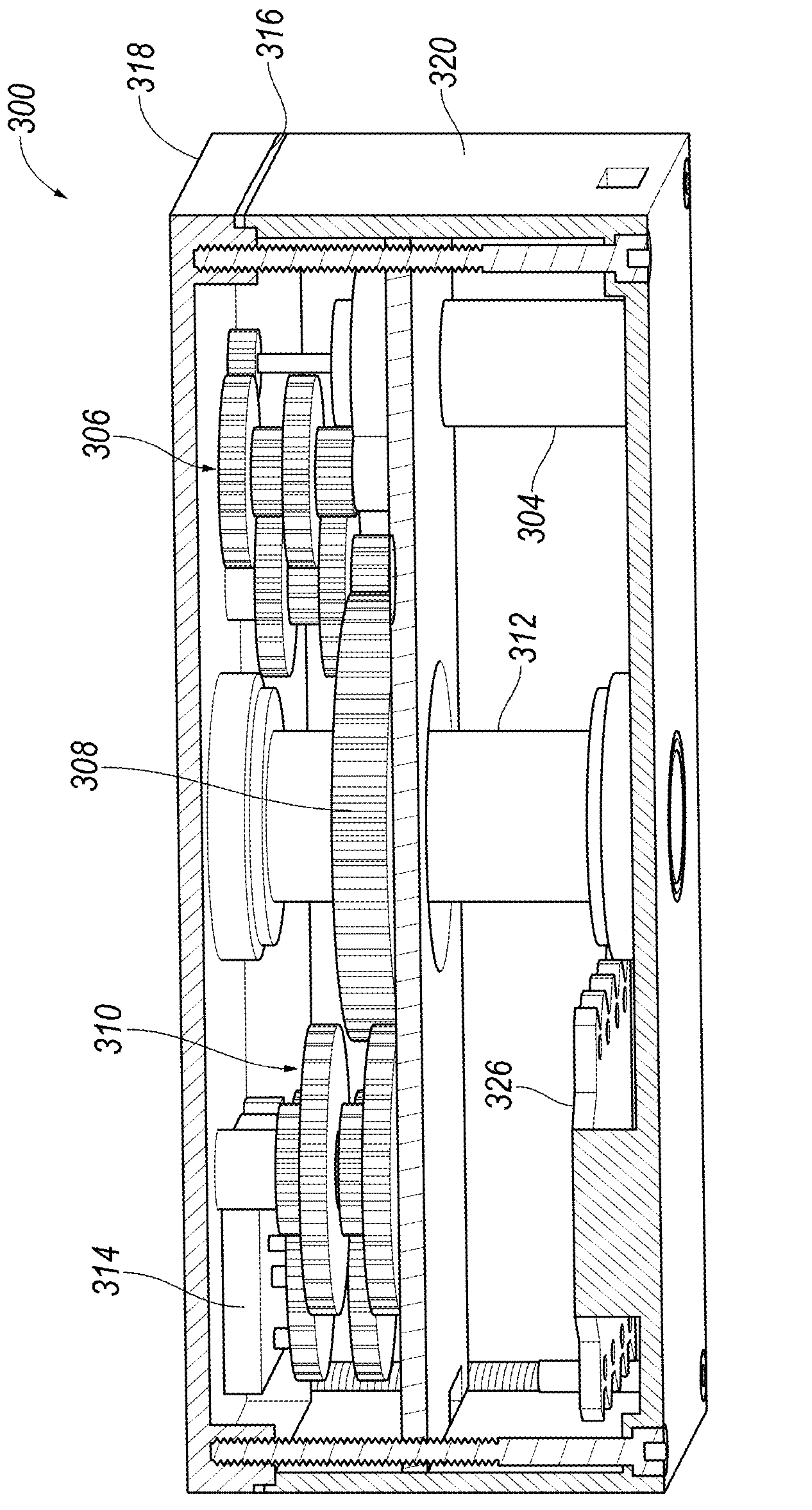
FIG. 3B is a sectional view of the actuator assembly taken along line 3B-3B of FIG. 3.

As shown in FIGS. 1A, 1B, and 2, a slide assembly 200 is movably disposed in the carburetor body 102 and configured to move across the throat 108. The slide assembly 200 includes a throttle slide 202 configured to move linearly relative to the throat 108 and perpendicular to a longitudinal axis 108A of the throat 108, such as to increase and decrease the volume of the venturi along the throat 108. The slide assembly 200 further includes a metering rod 204 that extends across the throat 108 and at least partially along the metering channel 112 and into the fuel reservoir 110. The metering rod 204 extends through the throttle slide 202, such as along a bore 206 formed through the throttle slide 202, and is axially movable relative to the throttle slide 202 and the fuel reservoir 110 independent of movement of the throttle slide 202. The throttle slide 202 and the metering rod 204 may move along a longitudinal axis 200A of the slide assembly 200 that is coaxial with a longitudinal axis 204A of the metering rod 204.

When fuel is metered from the fuel reservoir 110 to the throat 108 for introduction to the airflow, the fuel travels along the metering rod 204 within the metering channel 112 and is atomized for mixing with the airflow. The axial position of the metering rod 204 along the metering channel 112 and relative to the fuel reservoir 110 (i.e., the position of the metering rod 204 relative to the fuel reservoir 110 along the longitudinal axis 204A of the metering rod 204) adjusts an amount of fuel allowed to travel from the fuel reservoir 110 along the metering channel 112 and thus adjusts an amount of fuel introduced to the airflow within the throat 108. For example, the carburetor system 100 and slide assembly 200 including the metering rod 204 may utilize characteristics of the carburetors and metering rods described in U.S. Pat. Nos. 10,371,100 and/or 8,931,458, which are hereby incorporated herein by reference in their entireties.

The carburetor system 100 further includes an electrically operable actuator 300 that, when operated, adjusts the axial position of the metering rod 204 relative to the fuel reservoir 110 for adjusting the amount of fuel introduced to the airflow from the fuel reservoir 110. In the illustrated example of FIGS. 1-3B, the actuator 300 includes a housing 302 mounted to an upper panel or body portion 114 of the carburetor body 102 and that accommodates an electrically operable motor 304 (e.g., a stepper motor), a first gear train 306 (e.g., a first series of connected plastic reduction gears), an output gear 308, and a second gear train 310 (e.g., a second series of connected plastic reductions gears). The motor 304 drives the first gear train 306 to impart movement of the output gear 308 to rotatably drive a hollow drive shaft 312. The metering rod 204 is rotationally fixed relative to the carburetor body 102 and threadably coupled to an end of the drive shaft 312 such that rotational movement of the drive shaft 312 during operation of the actuator 300 imparts linear movement of the metering rod 204 relative to the drive shaft 312 and the fuel reservoir 110. The second gear train 310 of the actuator 300 may be coupled to the output gear 308 and rotatably driven by movement of the output gear 308 so that a position sensor or encoder 314 may monitor or track the absolute axial position of the metering rod 204 based on movement of the second gear train 310.

The drive shaft 312 extends from the actuator housing 302 and through the upper panel 114 of the carburetor body 102 for threadably coupling to the metering rod 204. Accordingly, a diameter 312D of the drive shaft 312 is configured to accommodate the throttle slide 202 and the metering rod 204. For example, the drive shaft diameter 312D may be 16 millimeters or less. As the drive shaft 312 is rotatably driven, the metering rod 204 linearly extends or retracts relative to the drive shaft 312 and the fuel reservoir 110 to adjust the amount of fuel allowed to flow from the fuel reservoir 110 to the throat 108 along the metering rod 204. For example, the metering rod 204 is axially moved toward the drive shaft 312 upward from the fuel reservoir 110 to increase the amount of fuel introduced to the airflow and the metering rod 204 is axially moved away from the drive shaft 312 downward toward the fuel reservoir 110 to decrease the amount of fuel introduced to the airflow. The actuator 300 may be configured to provide an accuracy of over 2,000 steps per revolution, which provides precise adjustment of the metering rod 204, such as in increments of 0.001 inches or less or 0.0001 inches or less, to provide precise or acute control of the amount of fuel from the fuel reservoir 110. The actuator 300 is also configured to adjust axial position of the metering rod 204 with larger movements, such as in increments of 0.015 inches or greater. Further, the actuator 300 is powerful enough to overcome a sticking metering rod or other resistance experienced over the life of the carburetor system 100.

To provide a sealed and watertight connection between the carburetor body 102 and the actuator 300, a gasket or seal 316 is disposed between an upper portion or panel 318 of the actuator housing 302 and a body portion 320 of the housing 302, a first O-ring or gasket or seal 322 circumscribes the drive shaft 312 and is disposed between an upper flange of the drive shaft 312 and the upper panel 318 of the actuator housing 302, and a second O-ring or gasket or seal 324 circumscribes the drive shaft 312 and is disposed between a lower flange of the drive shaft 312 and the upper panel 114 of the carburetor body 102 and/or an inner surface of the actuator housing 302. The actuator housing 302 may be formed from any suitably durable and lightweight material, such as an acetal or polyoxymethylene. The gaskets may be formed from any suitably durable and compressible material, such as Buna-N or other rubber compound.

Figure 4:
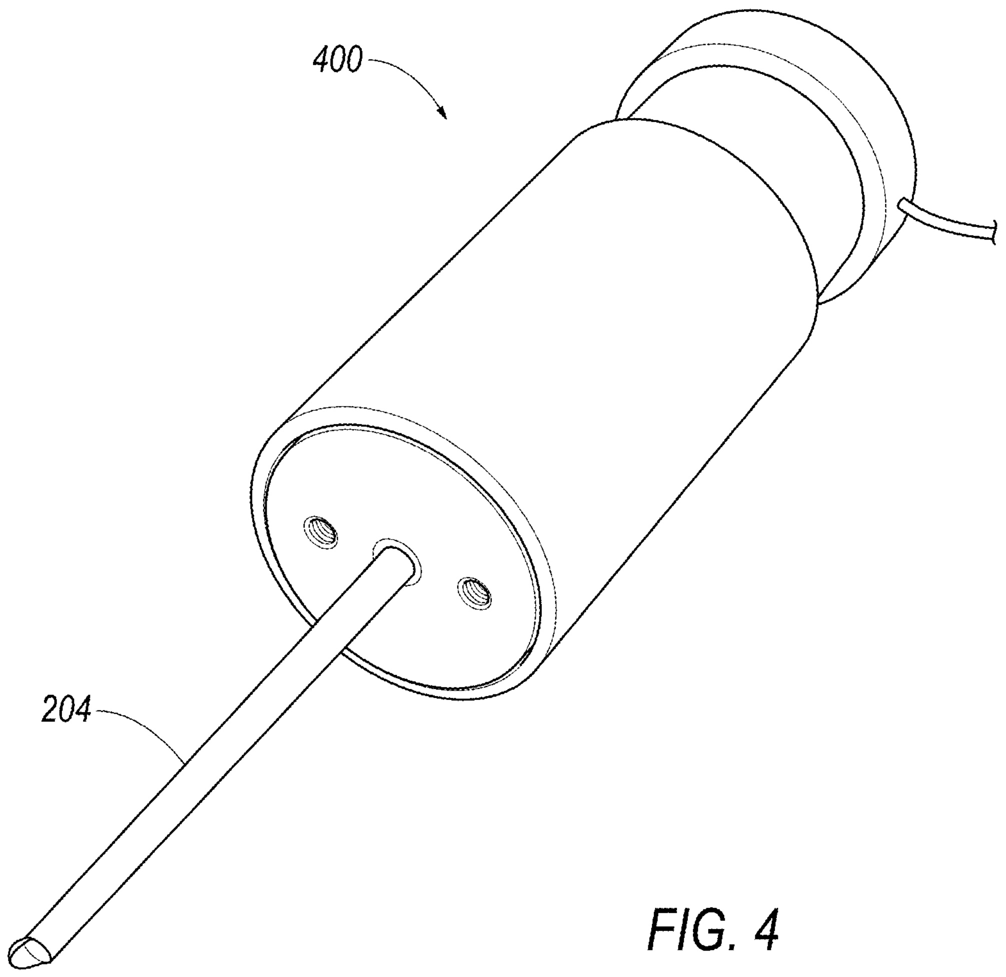
FIG. 4 is a perspective view of a linear actuator configured for use with the carburetor.

As shown in FIG. 4, in some examples, the axial position of the metering rod 204 is adjustable via operation of a voice coil actuator or encapsulated linear actuator 400. It should be understood that operation of the carburetor system 100 with the linear actuator 400 should produce similar results as the actuator 300, that is precise and immediate control of axial positioning of the metering rod 204 within the carburetor body 102.

Figure 5:
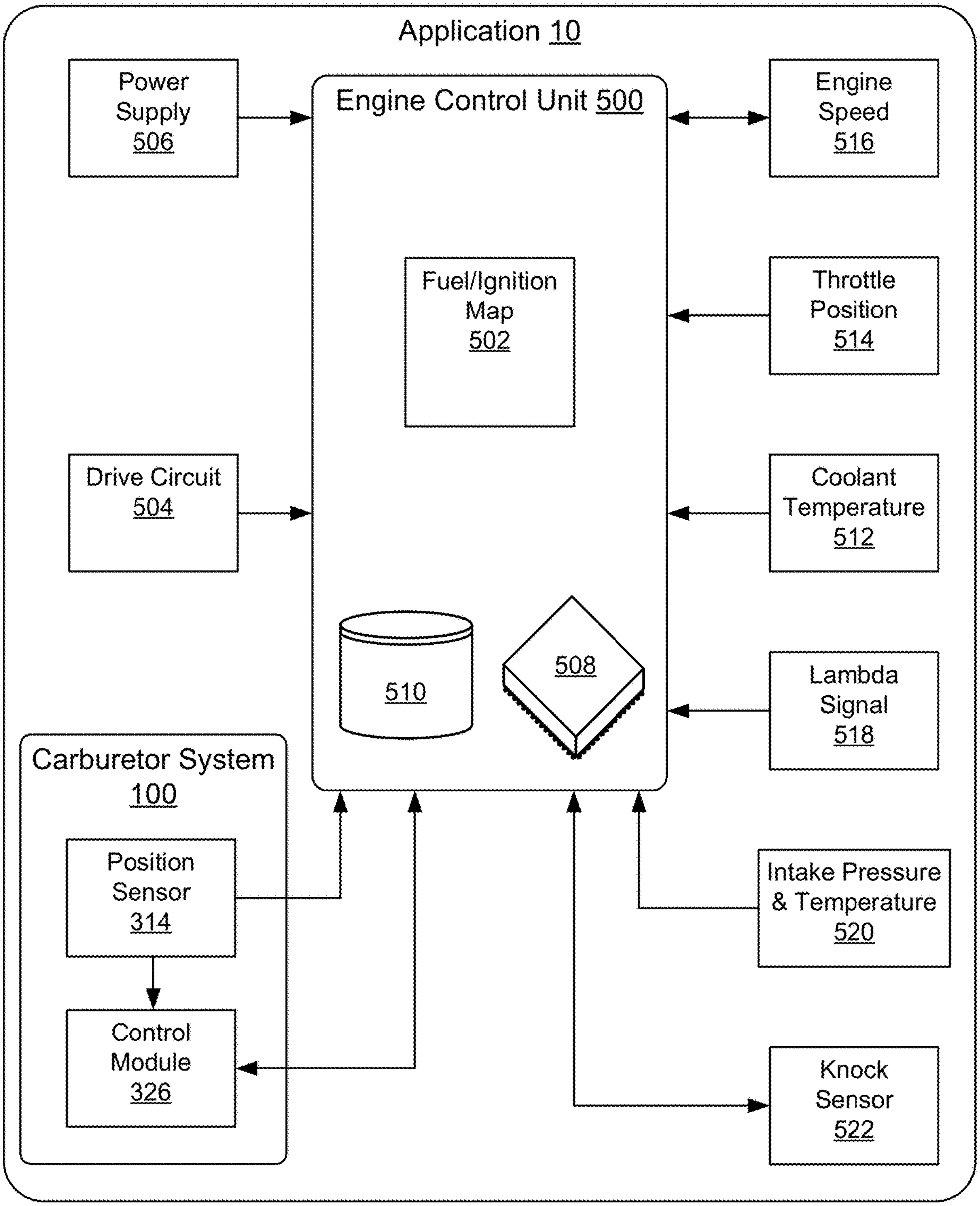
FIG. 5 is a schematic view of the engine control unit (ECU) at the application and in communication with the control module at the carburetor.

Referring now to FIG. 5, operation of the actuator 300 to adjust axial position of the metering rod 204 and therefore adjust levels of fuel introduced to the airflow delivered to the internal combustion engine, is controlled at least in part by a control module 326 hosted at the actuator 300 and an engine control unit (ECU) 500 of the application 10 at which the carburetor system 100 is equipped. For example, the carburetor system 100 may be equipped at an internal combustion engine for lawn and gardening equipment, small farm equipment, sport recreational products, small aircraft, lightweight vehicles such as motorcycles, and other suitable applications. The actuator 300 may accommodate an onboard battery for powering the electrically operable motor 304 due to lack of consistent charging capabilities across different applications, and to allow for simpler accommodation of the carburetor system 100 at the application 10. The ECU 500 may control operation of the internal combustion engine at the application 10 based on signals from one or more sensors and systems at the application 10 and based on a fuel/ignition map 502 and/or instructions from a drive circuit 504, where operation includes operating the actuator 300 at the carburetor system 100 for adjusting the fuel levels introduced to the intake airflow. The ECU 500 draws power from a power source 506 at the application 10. Although described herein as the ECU 500 and the control module 326 at the carburetor system 100 sharing control of the actuator 300 and carburetor system 100, it should be understood that other examples may have the ECU 500 or the control module 326 at the carburetor system 100 in sole control of the actuator 300 and carburetor system 100.

In the illustrated example, the ECU 500 includes data processing hardware 508 and memory hardware 510 in communication with the data processing hardware 508. The memory hardware 510 stores instructions that, when executed on the data processing hardware 508, cause the data processing hardware 508 to perform operations. For example, the memory hardware 510 stores instructions for operating the electrically operable actuator 300 for adjusting the amount of fuel introduced to the airflow through the carburetor system 100. Optionally, the instructions are stored at the control module 326 at the carburetor system 100 for operating the actuator 300 responsive to signals from the ECU 500.

Connecting operation of the actuator 300, and thus adjustability of the fuel levels introduced to the carburetor system 100, to the ECU 500 of the application 10 allows for real-time control of the axial position of the metering rod 204 to dynamically vary the fueling rate by using rapid and precise movements, which yields improved emissions, fuel economy, and engine performance. In other words, the axial position of the metering rod 204 is adjustable in real-time during operation of the engine to achieve optimized fuel delivery to the internal combustion engine using the carburetor system 100. Integrating control of the fueling rate provided by the carburetor system 100 with onboard diagnostics and performance settings of the ECU 500 provides closed-loop feedback where adjusting the axial position of the metering rod 204 results in measurable changes in engine performance detected by onboard sensors and allows for near instantaneous changes in air/fuel ratio control to meet compliance standards.

For example, the ECU 500 may instruct the actuator 300 to adjust the axial position of the metering rod 204 at least between a cold-start position, which provides a richer air-to-fuel ratio for cold starting of the internal combustion engine, a baseline or starting position, which provides a leaner air-to-fuel ratio for normal operation of the engine, and an ideal or full-throttle position, which provides an air-to-fuel ratio between the cold-start position and the baseline position for wide-open operation of the engine. The metering rod 204 may be adjusted to the cold-start position based on determination that a temperature of the internal combustion engine is below a threshold temperature upon startup, such as based on signals received at the ECU related to a coolant temperature 512 of the engine, or based on determination that the engine has been started after being inactive for at least a threshold period of time. Similarly, the metering rod 204 may be adjusted from the cold-start position to the baseline position based on the engine warming above the threshold temperature. In other words, the metering rod 204 may be adjusted to the predetermined rich setting during cold starting and then, as the engine warms up, the metering rod 204 is returned to the baseline. This may eliminate the need for a traditional cold start enrichment or choke circuit and improve emissions of the engine during cold start as the engine approaches ability to sustain leaner operation. Further, based on a throttle position 514 of the engine and/or an engine speed 516 (e.g., a speed in RPMs of a crankshaft of the engine) determined at the ECU 500, the metering rod 204 is adjusted to the ideal position.

Movement between the cold-start position, baseline position, and ideal position may represent substantial axial movements of the metering rod 204, such as increments of 0.015 inches or greater. When in the cold-start position, baseline position, and ideal position, or any intermediate position, the axial position of the metering rod 204 may be acutely or finely tuned, such as with movements in increments of 0.001 inches or less, to maintain consistent air-to-fuel ratios and optimized performance of the engine. For example, the engine may include a wideband oxygen sensor in an exhaust stream of the engine that provides a lambda signal 518 to the ECU 500.

The lambda signal 518 is equal to 1 when the ideal stoichiometric air-to-fuel ratio of 14.7 is present, which represents the ideal ratio of air required for complete combustion of the fuel. The actuator 300 may be operated to adjust the axial position of the metering rod 204 based on the lambda signal 518, that is based on the determined air-to-fuel ratio, such as to achieve a target lambda of 1 (14.7 air-to-fuel ratio). In some examples, the ECU 500 relays the lambda signal 518 to the control module 326 at the carburetor system 100 and the control module 326 operates the actuator 300 to increase or decrease the amount of fuel introduced to the airflow to cause changes in the lambda signal 518.

Put another way, the axial position of the metering rod 204 may be controlled according to closed-loop feedback guided by the lambda signal 518. Based on the real-time lambda signal 518 and a difference between the lambda signal 518 and the target lambda, the axial position of the metering rod 204 is adjusted to increase or decrease the level of fuel introduced to the airflow. For example, based on the lambda signal 518, the ECU 500 may instruct the carburetor system 100 to increase or decrease the level of fuel introduced to the airflow and the control module 326 at the carburetor system 100 may control operation of the actuator 300 to achieve the requested increase or decrease in fueling rate. In other examples, the ECU 500 may transmit the lambda signal 518 to the control module 326 at the carburetor system 100 for determining increases and decreases in the fueling rate.

Thus, as the airflow through the carburetor system 100 changes during operation of the engine, such as based on throttle position 514 and intake pressure and temperature 520, the system may adjust axial position of the metering rod 204 to achieve a target lambda value. For example, the system may control lambda between 0.8 and 1.2 with accuracy of ±0.05 or ±0.01 or better, and the system may be configured to adjust the lambda value in intervals of 0.05 or 0.01 or less. The ECU 500 may adjust the target lambda to achieve improved performance, fuel economy, and/or emissions based on current operation of the application 10. For example, a richer fuel and air mixture may provide improved performance while a leaner fuel and air mixture may provide improved efficiency and lower emissions. Accordingly, the target lambda value guiding operation of the carburetor system 100 may be adjusted based on a target power output of the engine, a target efficiency of the engine, a target emissions level of the engine, and the like. In this way, operation of the carburetor system 100 is interfaced with onboard diagnostics to provide responsive adjustment of the fueling rate at the engine intake, leading to improved compliance with emissions and fuel economy standards while maintaining or improving performance.

Further, the ECU 500 and/or control module 326 may store readouts from the position sensor 314 and data related to engine performance, emissions, and fuel efficiency to determine repeatable settings for the metering rod 204 based on target lambda values under different engine operating conditions. In other words, the system may record and apply data in relation to other application sensors for comparison, analysis, programming and future design. For example, the system may determine ideal positions for the metering rod 204 based on throttle position 514, intake pressure and temperature 520, and the like. The actuator 300 may determine and repeat positions of the metering rod 204 relative to the slide 202 and/or fuel reservoir 110 with accuracy of +0.001 inches or less. The ECU 500 may further communicate with a knock sensor 522 of the application 10 during operation.

On the fly adjustability of the air-to-fuel ratio allows the application 10 to achieve improved performance during high-strain usage and improved efficiency and emissions during standard and/or low-strain usage without manual adjustment of the carburetor settings. This real time adjustment of the carburetor system 100 may result in fueling control similar to that provided by electronic fuel injection systems as the system interfaces directly with the ECU 500 and provides onboard diagnostics for regulatory analysis, data gathering, and emissions verification. Capturing and storing positions of the metering rod 204 during different operational parameters allows the system to provide repeatable and reliable performance across uses of the application 10. By interfacing with the ECU 500, the user may adjust or tune these metering rod adjustments based on desired performance. That is, on-demand fueling control maintains consistent ideal lambda ratios and peak performance while providing tuning optimization for a variety of different applications. These applications may have set conditions requiring prioritization of one or more of performance, mileage, and emissions, and the carburetor system 100 achieves these performance metrics with fine tuning of the air-to-fuel ratio supplied to the engine.

In some examples, the carburetor system 100 is configured to apply resonance frequencies or vibrations through the metering rod 204 to improve fuel vaporization and uniform fuel distribution. For example, the carburetor system 100 may be equipped with an electrically operable vibration actuator that vibrates the metering rod 204 at an adjustable frequency. The vibration actuator may be accommodated within the housing 302 of the linear actuator 300.

Specific frequencies applied at the metering rod 204 may be coincident or non-coincident with the engine's natural harmonic resonances, such as that occur when the engine speed 516 increases or decrease and when fuel efficiencies rise and fall. Because the carburetor system 100 is connected with the ECU 500, the system may adjust the frequency applied at the metering rod 204 based on known predetermined operating speeds of the engine. This allows the system to target frequencies that correspond to the most common frequencies occurring across the range of engine operation. These controlled vibrations will assist with fuel atomization and may work in conjunction with vortex shedding that occurs along an axial flat portion of the metering rod 204.

Frequencies applied to the metering rod 204 may be determined based on the engine speed 516 (e.g., the rotational speed of the crankshaft in RPMs) and a duration of the intake opening period in degrees of crankshaft rotation. For example, the frequencies at which the metering rod 204 is vibrated to attenuate engine vibrations may be determined by converting the engine's intake open period in degrees of crankshaft rotation into time at a specified RPM range and by converting the degrees of the intake port opening is into time. Thus, the frequency (e.g., in kilohertz) at which the metering rod 204 is vibrated is determined based on the engine speed in RPMs and the period the intake port is open in degrees, where the port open interval is converted from degrees of crankshaft rotation into a period of time at the specified RPMs.

Thus, the carburetor system 100 includes an electrically operated motor 304 and associated controller 326 for adjusting a position of the metering rod 204 in real time based on engine operation and emissions, which allows for more immediate and more precise adjustment of the air-to-fuel ratio driven to the combustion engine. The carburetor system 100 may also be configured to apply a vibration to the metering rod 204 to cause better fuel atomization. Accordingly, the carburetor system 100 provides a simple and efficient non-fuel injection fuel system that directly interfaces with a modern engine control unit 500 and diagnostic equipment to economically meet pending and future emissions regulations that require monitoring of emissions control equipment. The carburetor system 100 can respond and adjust immediately, such as for load, RPM, temperature, and throttle position changes in a way equal to or better than modern electronic fuel injection systems. Real-time control of the axial positioning of the metering rod 204 to dynamically vary the fueling rate by using rapid and precise movements yields immediate benefits, such as on-fly adjustability, eliminating the need for a cold start enrichment or choke circuit, and on-demand fueling control that maintains consistent air-to-fuel ratios and peak performance.

Moreover, the carburetor system 100 enables ultra-lean burn combustion engines to meet emissions regulations without the need for precious metal exhaust catalysts. While electronic fuel injection systems may be inadequate at producing the fine spray necessary to support lean-burn combustion methodologies, the single point fuel delivery system and ultra-fine fuel atomization provided by the carburetor system 100 achieve North American EPA, CARB, and Canadian CEPA emissions standards, among others.

Further, although described herein as related to a slide and pin style carburetor, it should be understood that aspects of the disclosure may be suitable for use with any number of other devices or systems, such as those used to vaporize liquid fuels, liquefied natural gas (LNG) or compressed natural gas (CNG), solvents, cleaners, and the like.

Figure 6:
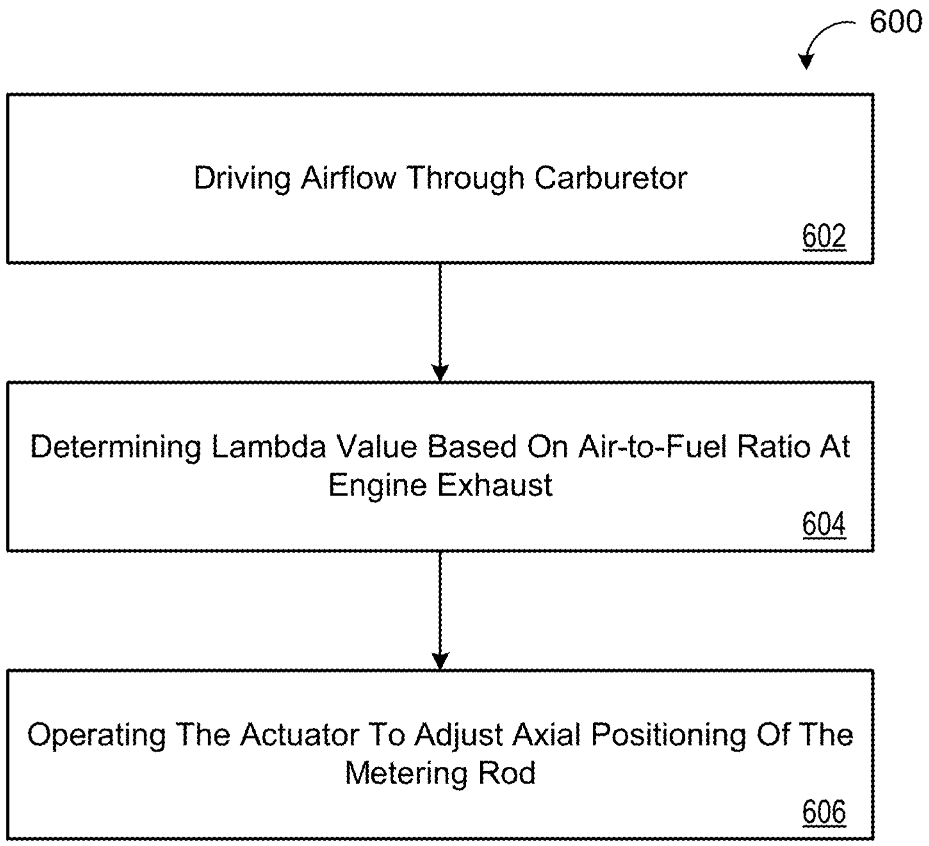
FIG. 6 is a flow diagram of an example method of controlling operation of the carburetor.

FIG. 6 provides a flowchart of an exemplary arrangement of operations for a method 600 of controlling operation of the carburetor system 100. For example, instructions for the method 600 may be stored at the memory hardware 510 of the ECU 500 and executed at data processing hardware 508 of the ECU 500 and/or the control module 326 at the actuator 300 of the carburetor system 100. At operation 602, the method 600 includes operating the engine and driving airflow through the carburetor body 102. As the airflow moves through the throat 108 of the carburetor body 102, fuel is fed from the fuel reservoir 110 of the carburetor system 100 and mixed with the airflow. Based on signals from an oxygen sensor in the exhaust stream of the engine, the method 600 includes, at operation 604, determining a lambda value based on an air-to-fuel ratio at the engine exhaust. At operation 606, the method 600 includes operating the electrically operable actuator 300 to adjust the axial position of the metering rod 204 relative to the fuel reservoir 110. This adjusts an amount of fuel introduced to the airflow within the throat 108 from the fuel reservoir 110 and thus adjusts the air-to-fuel ratio provided to the engine and resultant lambda value.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

A number of implementations have been described. Nevertheless, it will be understood that various modifications may be made without departing from the spirit and scope of the disclosure. Accordingly, other implementations are within the scope of the following claims.

What is claimed is:

1. A carburetor for an internal combustion engine, the carburetor comprising:

a body having an air inlet opening portion, an air outlet opening portion, and a throat portion extending therebetween;

a fuel reservoir in fluid communication with the throat portion;

a slide assembly movably disposed in the body for movement across the throat portion, the slide assembly comprising a metering rod extending across the throat portion and into the fuel reservoir; and an electrically operable actuator that, when operated, adjusts an axial position of the metering rod relative to the fuel reservoir based on at least one selected from the group consisting of (i) a target power output of the internal combustion engine, (ii) a target efficiency of the internal combustion engine, and (iii) a target emissions level of the internal combustion engine, wherein the electrically operable actuator adjusts the axial position of the metering rod relative to the fuel reservoir in increments of 0.001 inches or less.

2. The carburetor of claim 1, wherein, as airflow moves from the air inlet opening portion to the air outlet opening portion through the throat portion, adjustment of the axial position of the metering rod adjusts an amount of fuel introduced to the airflow within the throat portion from the fuel reservoir.

3. The carburetor of claim 2, wherein the electrically operable actuator adjusts the axial position of the metering rod based on an air-to-fuel ratio.

4. The carburetor of claim 3, wherein the air-to-fuel ratio is determined based on sensor data generated by an oxygen sensor sensing an exhaust stream from the internal combustion engine.

5. The carburetor of claim 2, wherein the electrically operable actuator adjusts the axial position of the metering rod at least between a cold start position, a baseline position, and a wide-open position, and wherein the amount of fuel introduced to the airflow is greater with the metering rod in the cold start position and the wide-open position than with the metering rod in the baseline position.

6. The carburetor of claim 5, wherein the electrically operable actuator adjusts the metering rod to the cold start position based on determination that a temperature of the internal combustion engine is below a threshold temperature.

7. The carburetor of claim 5, wherein the electrically operable actuator adjusts the metering rod from the cold start position to one of the baseline position and the wide-open position based on determination that a temperature of the internal combustion engine is above a threshold temperature.

8. The carburetor of claim 5, wherein, with the metering rod in one of the cold start position, the baseline position, and the wide-open position, the electrically operable actuator finely adjusts the axial position of the metering rod.

9. The carburetor of claim 1, wherein the slide assembly further comprises a throttle slide, and wherein the metering rod extends through the throttle slide and is axially movable independent of movement of the throttle slide.

10. The carburetor of claim 1, wherein the electrically operable actuator adjusts the axial position of the metering rod responsive to a signal from an engine control unit of the internal combustion engine.

11. The carburetor of claim 1, wherein the electrically operable actuator adjusts the axial position of the metering rod based on an input of at least one selected from the group consisting of (i) an air-to-fuel ratio at an exhaust stream of the internal combustion engine, (ii) a rotational speed of a crankshaft of the internal combustion engine, (iii) a throttle position, (iv) a coolant temperature of the internal combustion engine, (v) a temperature of air intake of the internal combustion engine, (vi) a pressure of air intake of the internal combustion engine, and (vii) a knock signal.

12. The carburetor of claim 1, further comprising an electrically operable vibration actuator that, when operated, vibrates the metering rod at a frequency.

13. The carburetor of claim 12, wherein the frequency is determined based on a rotational speed of a crankshaft of the internal combustion engine and a duration of an opening period for an intake manifold fluidly coupled to the air inlet opening portion.

14. The carburetor of claim 1, wherein the electrically operable actuator comprises one selected from the group consisting of (i) a stepper motor, (ii) a voice coil actuator, and (iii) an encapsulated linear actuator.

15. The carburetor of claim 1, wherein operation of the electrically operable actuator to adjust the axial position of the metering rod relative to the fuel reservoir is controlled according to a closed-loop feedback system.

16. A computer-implemented method when executed on data processing hardware causes the data processing hardware to perform operations comprising:

as airflow moves through a throat portion of a carburetor of an internal combustion engine, operating an electrically operable actuator to adjust an axial position of a metering rod relative to a fuel reservoir of the carburetor, the fuel reservoir in fluid communication with the throat portion, and the metering rod extending across the throat portion and into the fuel reservoir; and wherein adjustment of the axial position of the metering rod adjusts an amount of fuel introduced to the airflow within the throat portion from the fuel reservoir based on at least one selected from the group consisting of (i) a target power output of the internal combustion engine, (ii) a target efficiency of the internal combustion engine, and (iii) a target emissions level of the internal combustion engine, wherein the electrically operable actuator adjusts the axial position of the metering rod relative to the fuel reservoir in increments of 0.001 inches or less.

17. The method of claim 16, wherein the electrically operable actuator is operated to adjust the axial position of the metering rod based on an air-to-fuel ratio.

18. The method of claim 17, wherein the air-to-fuel ratio is determined based on sensor data generated by an oxygen sensor sensing an exhaust stream from the internal combustion engine.

19. The method of claim 16, wherein the operations further comprise operating the electrically operable actuator to adjust the axial position of the metering rod at least between a cold start position, a baseline position, and a wide-open position, and wherein the amount of fuel introduced to the airflow is greater with the metering rod in the cold start position and the wide-open position than with the metering rod in the baseline position.

20. The method of claim 19, wherein the operations further comprise operating the electrically operable actuator to adjust the metering rod to the cold start position based on determination that a temperature of the internal combustion engine is below a threshold temperature.

21. The method of claim 19, wherein the operations further comprise operating the electrically operable actuator to adjust the metering rod from the cold start position to one of the baseline position and the wide-open position based on determination that a temperature of the internal combustion engine is above a threshold temperature.

22. The method of claim 19, wherein the operations further comprise, with the metering rod in one of the cold start position, the baseline position, and the wide-open position, operating the electrically operable actuator to finely adjust the axial position of the metering rod.

23. The method of claim 16, wherein the metering rod extends through a throttle slide of the carburetor and is axially movable independent of movement of the throttle slide.

24. The method of claim 16, wherein operating the electrically operable actuator to adjust the axial position of the metering rod is responsive to a signal from an engine control unit of the internal combustion engine.

25. The method of claim 16, wherein operating the electrically operable actuator to adjust the axial position of the metering rod is based on an input of at least one selected from the group consisting of (i) an air-to-fuel ratio at an exhaust stream of the internal combustion engine, (ii) a rotational speed of a crankshaft of the internal combustion engine, (iii) a throttle position, (iv) a coolant temperature of the internal combustion engine, (v) a temperature of air intake of the internal combustion engine, (vi) a pressure of air intake of the internal combustion engine, and (vii) a knock signal.

26. The method of claim 16, wherein the operations further comprise operating an electrically operable vibration actuator to vibrate the metering rod at a frequency.

27. The method of claim 26, wherein the frequency is determined based on a rotational speed of a crankshaft of the internal combustion engine and a duration of an opening period for an intake manifold fluidly coupled to the throat portion.

28. The method of claim 16, wherein the electrically operable actuator comprises one selected from the group consisting of (i) a stepper motor, (ii) a voice coil actuator, and (iii) an encapsulated linear actuator.

29. The method of claim 16, wherein operating the electrically operable actuator to adjust the axial position of the metering rod relative to the fuel reservoir of the carburetor is controlled according to a closed-loop feedback system.

30. A system, the system comprising:

a carburetor for an internal combustion engine, the carburetor comprising: a body having an air inlet opening portion, an air outlet opening portion, and a throat portion extending therebetween;

a fuel reservoir in fluid communication with the throat portion;

a slide assembly movably disposed in the body for movement across the throat portion, the slide assembly comprising a metering rod extending across the throat portion and into the fuel reservoir;

an electrically operable actuator that, when operated, adjusts an axial position of the metering rod relative to the fuel reservoir;

data processing hardware; and memory hardware storing instructions that, when executed on data processing hardware in communication with the memory hardware, cause the data processing hardware to perform operations comprising:

as airflow moves from the air inlet opening portion to the air outlet opening portion through the throat portion, operating the electrically operable actuator to adjust the axial position of the metering rod, wherein adjustment of the axial position of the metering rod adjusts an amount of fuel introduced to the airflow within the throat portion from the fuel reservoir based on at least one selected from the group consisting of (i) a target power output of the internal combustion engine, (ii) a target efficiency of the internal combustion engine, and (iii) a target emissions level of the internal combustion engine, wherein the electrically operable actuator adjusts the axial position of the metering rod relative to the fuel reservoir in increments of 0.001 inches or less.

31. The system of claim 30, wherein the electrically operable actuator is operated to adjust the axial position of the metering rod based on an air-to-fuel ratio.

32. The system of claim 31, wherein the air-to-fuel ratio is determined based on sensor data generated by an oxygen sensor sensing an exhaust stream from the internal combustion engine.

33. The system of claim 30, wherein the operations further comprise operating the electrically operable actuator to adjust the axial position of the metering rod at least between a cold start position, a baseline position, and a wide-open position, and wherein the amount of fuel introduced to the airflow is greater with the metering rod in the cold start position and the wide-open position than with the metering rod in the baseline position.

34. The system of claim 33, wherein the operations further comprise operating the electrically operable actuator to adjust the metering rod to the cold start position based on determination that a temperature of the internal combustion engine is below a threshold temperature.

35. The system of claim 33, wherein the operations further comprise operating the electrically operable actuator to adjust the metering rod from the cold start position to one of the baseline position and the wide-open position based on determination that a temperature of the internal combustion engine is above a threshold temperature.

36. The system of claim 33, wherein the operations further comprise, with the metering rod in one of the cold start position, the baseline position, and the wide-open position, operating the electrically operable actuator to finely adjust the axial position of the metering rod.

37. The system of claim 30, wherein the metering rod extends through a throttle slide of the carburetor and is axially movable independent of movement of the throttle slide.

38. The system of claim 30, wherein operating the electrically operable actuator to adjust the axial position of the metering rod is responsive to a signal from an engine control unit of the internal combustion engine.

39. The system of claim 30, wherein operating the electrically operable actuator to adjust the axial position of the metering rod is based on an input of at least one selected from the group consisting of (i) an air-to-fuel ratio at an exhaust stream of the internal combustion engine, (ii) a rotational speed of a crankshaft of the internal combustion engine, (iii) a throttle position, (iv) a coolant temperature of the internal combustion engine, (v) a temperature of air intake of the internal combustion engine, (vi) a pressure of air intake of the internal combustion engine, and (vii) a knock signal.

40. The system of claim 30, wherein the operations further comprise operating an electrically operable vibration actuator to vibrate the metering rod at a frequency.

41. The system of claim 40, wherein the frequency is determined based on a rotational speed of a crankshaft of the internal combustion engine and a duration of an opening period for an intake manifold fluidly coupled to the throat portion.

42. The system of claim 30, wherein the electrically operable actuator comprises one selected from the group consisting of (i) a stepper motor, (ii) a voice coil actuator, and (iii) an encapsulated linear actuator.

43. The system of claim 30, wherein operating the electrically operable actuator to adjust the axial position of the metering rod is controlled according to a closed-loop feedback system.

44. A carburetor for an internal combustion engine, the carburetor comprising:

a body having an air inlet opening portion, an air outlet opening portion, and a throat portion extending therebetween;

a fuel reservoir in fluid communication with the throat portion;

a slide assembly movably disposed in the body for movement across the throat portion, the slide assembly comprising a metering rod extending across the throat portion and into the fuel reservoir;

an electrically operable actuator that, when operated, adjusts an axial position of the metering rod relative to the fuel reservoir based on at least one selected from the group consisting of (i) a target power output of the internal combustion engine, (ii) a target efficiency of the internal combustion engine, and (iii) a target emissions level of the internal combustion engine; and an electrically operable vibration actuator that, when operated, vibrates the metering rod at a frequency.

45. The carburetor of claim 44, wherein, as airflow moves from the air inlet opening portion to the air outlet opening portion through the throat portion, adjustment of the axial position of the metering rod adjusts an amount of fuel introduced to the airflow within the throat portion from the fuel reservoir.

46. The carburetor of claim 45, wherein the electrically operable actuator adjusts the axial position of the metering rod based on an air-to-fuel ratio.

47. The carburetor of claim 46, wherein the air-to-fuel ratio is determined based on sensor data generated by an oxygen sensor sensing an exhaust stream from the internal combustion engine.

48. The carburetor of claim 45, wherein the electrically operable actuator adjusts the axial position of the metering rod at least between a cold start position, a baseline position, and a wide-open position, and wherein the amount of fuel introduced to the airflow is greater with the metering rod in the cold start position and the wide-open position than with the metering rod in the baseline position.

49. The carburetor of claim 48, wherein the electrically operable actuator adjusts the metering rod to the cold start position based on determination that a temperature of the internal combustion engine is below a threshold temperature.

50. The carburetor of claim 48, wherein the electrically operable actuator adjusts the metering rod from the cold start position to one of the baseline position and the wide-open position based on determination that a temperature of the internal combustion engine is above a threshold temperature.

51. The carburetor of claim 48, wherein, with the metering rod in one of the cold start position, the baseline position, and the wide-open position, the electrically operable actuator finely adjusts the axial position of the metering rod.

52. The carburetor of claim 44, wherein the slide assembly further comprises a throttle slide, and wherein the metering rod extends through the throttle slide and is axially movable independent of movement of the throttle slide.

53. The carburetor of claim 44, wherein the electrically operable actuator adjusts the axial position of the metering rod responsive to a signal from an engine control unit of the internal combustion engine.

54. The carburetor of claim 44, wherein the electrically operable actuator adjusts the axial position of the metering rod based on an input of at least one selected from the group consisting of (i) an air-to-fuel ratio at an exhaust stream of the internal combustion engine, (ii) a rotational speed of a crankshaft of the internal combustion engine, (iii) a throttle position, (iv) a coolant temperature of the internal combustion engine, (v) a temperature of air intake of the internal combustion engine, (vi) a pressure of air intake of the internal combustion engine, and (vii) a knock signal.

55. The carburetor of claim 44, wherein the frequency is determined based on a rotational speed of a crankshaft of the internal combustion engine and a duration of an opening period for an intake manifold fluidly coupled to the air inlet opening portion.

56. The carburetor of claim 44, wherein the electrically operable actuator comprises one selected from the group consisting of (i) a stepper motor, (ii) a voice coil actuator, and (iii) an encapsulated linear actuator.

57. The carburetor of claim 44, wherein operation of the electrically operable actuator to adjust the axial position of the metering rod relative to the fuel reservoir is controlled according to a closed-loop feedback system.

* * * * *